2,752,289

CONDITIONING CATALYSTS EMPLOYED IN THE REFORMING OF HYDROCARBONS

Vladimir Haensel, Hinsdale, Ill., assignor to Universal Oil Products Company, Chicago, Ill., a corporation of Delaware No Drawing. Application January 27, 1950, Serial No. 140,943

6 Claims. (Cl. 196—50)

This invention relates to conditioning catalysts and more particularly to a novel method of controlling the specific activity of catalysts.

The invention is particularly applicable to catalysts which contain the active component or components in small amounts. In such catalysts, even a small increase in certain substances, particularly acidic components, serves to increase a specific activity of the catalyst to a degree greater than desired. For example, in reforming processes effected in the presence of a catalyst containing a very small amount of active components, an increase in acidic components serves to increase the cracking or splitting of carbon to carbon bonds to an extent greater than desired.

In reforming processes, it is desired to dehydrogenate naphthenic hydrocarbons to produce aromatics, and to effect a controlled cracking or splitting of long chain aliphatic hydrocarbons, as well as to effect isomerization of straight chain to branched chain hydrocarbons, cyclization of aliphatic hydrocarbons, hydrogen transfer reactions, etc. It is important that the cracking or splitting reaction be controlled in order that the gasoline charging stock is not converted to gases to an excessive degree which in turn results in low yields of the desired reformed gasoline. Further, the excessive cracking leads to a faster rate of carbon formation on the catalyst which in turn deactivates the catalyst and requires more frequent replacement thereof. In a reforming process effected in the presence of hydrogen, the cracking, now termed "hydrocracking," leads to a lower concentration of hydrogen in the recycled gas and this in turn may result in a shortage of hydrogen necessary for effecting the desired reforming operation. On the other hand, controlled or selective cracking is highly desirable since such cracking will result in a product of improved antiknock characteristics. Therefore, it is apparent that the balance between cracking and the other reactions in a reforming operation is of utmost importance.

In one embodiment the present invention relates to a process for removing an acidic component from a catalyst containing the same, which comprises treating said catalyst with a reagent containing a cation selected from ammonium and aluminum, and an anion convertible to an oxide.

In a specific embodiment the present invention relates to a process for removing chlorine from a platinum-alumina catalyst containing the same which comprises treating said catalyst with ammonium nitrate.

The invention will be more particularly described with reference to the conditioning of a catalyst comprising alumina, from about 0.01% to about 1% platinum and from about 0.1% to about 3% fluorine, which catalyst is used in the reforming of gasoline. The gasoline charging stock to the reforming process generally will comprise a substantially saturated gasoline, such as straight run gasoline, natural gasoline, etc. or a selected fraction thereof, including fractions referred to as naphtha which may have boiling points ranging up to 450° F. or more. In some cases, the charging stock to the reforming process may comprise a mixture thermally cracked and a saturated gasoline, or fractions thereof.

While the specific description is directed primarily to reforming processes, it is understood that the invention may also be applicable to other processes in which an excess of acidic components results in an excessive reaction. For example, in the dehydrogenation of saturated hydrocarbons, excessive acidic components may result in undesired cracking. Also, in certain dehydrogenation reactions, it is desired to dehydrogenate only a certain class of components in the charge, and the presence of the excessive acidic components results in undesired dehydrogenation of the other components. Similarly, in isomerization reactions the presence of excessive acidic components may result in undesired cracking reactions as well as in undesired isomerization of the partly isomerized products. The same general principle may likewise be true in alkylation reactions, such as the alkylation of paraffinic or aromatic hydrocarbons with olefins, alcohols, ethers, esters, etc., hydrogenation reactions to convert unsaturated hydrocarbons, alcohols, acids, etc. to the corresponding saturated compounds, etc.

Further, while the specific description of the invention is directed primarily to the use of alumina-platinum-fluorine catalysts, it is understood that the invention is also applicable to other reforming catalysts as, for example, alumina-platinum, silica-alumina-platinum, silica-zirconia-platinum, silica-magnesia-platinum, silica-thoria-platinum, etc., similar compositions containing palladium, ruthenium, rhodium, silver, gold, etc., or mixtures thereof, as well as other metals. In general, the more expensive metals are utilized in very low concentrations and the effect of acidic components is more pronounced in smaller amounts and, therefore, the invention is particularly applicable to such catalysts. Also, it is understood that, in place or in addition to the fluorine, the catalyst may contain chlorine in a specific amount.

Referring now to a reforming process utilizing a platinum-alumina-fluorine catalyst, a very successful commercial process utilizes a catalyst comprising alumina, platinum in an amount of from about 0.01% to about 1% by weight and fluorine in an amount of from about 0.1% to about 3% by weight. The reforming process is readily effected at a temperature of from about 600° to about 1000° F., a pressure within the range of from about 50 to about 1000 pounds per square inch and a weight hourly space velocity of from about 0.5 to about 10. The weight hourly space velocity is defined as the weight of oil per hour per weight of catalyst in the reaction zone. This process is preferably effected in the presence of hydrogen which generally is used in a concentration of from about 0.5 to about 10 mols of hydrogen per mol of hydrocarbon.

The reforming process may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. The hydrogen is preferably recycled in order to maintain the desired hydrogen concentration in the reaction zone. Other suitable units in which the process may be effected include the fluidized type process in which the hydrogen and catalyst are maintained in a state of turbulence under hindered settling conditions in a reaction zone, the compact moving bed type in which the catalyst and hydrocarbons are passed either concurrently or countercurrently to each other, and the suspensoid type of operation in which the catalyst is carried into the reaction zone as a slurry in the hydrocarbon oil.

It has been found that the reforming catalyst tends to accumulate and retain acidic components contained in the charging stock to the process. Thus, it has been found that certain gasolines contain combined chlorine, and the chlorine is retained by the catalyst and this in turn increases the hydrocracking activity of the catalyst to an extent greater than desired. Other acidic components which may be contained in the gasoline charging stock include sulfates, borates, phosphates, etc. The extent to which the gasoline contains these components will depend upon the source from which gasoline was originally obtained. As hereinbefore set forth, this upsets the desired balance between cracking and other reactions in the reforming operation and results in a decreased yield of desired reformed gasoline and an increased yield of undesired gaseous products.

In accordance with the present invention the catalyst containing an excessive chlorine content is treated with a particular type of reagent to remove the chlorine and to thereby restore the desired selectivity of the catalyst in effecting the proper balance between cracking and other reactions. In view of the fact that this catalyst contains platinum and fluorine in so small amounts, it is important that the reagent used for treating the catalyst does not introduce an undesired impurity in the catalyst which in turn will tend to mask the catalytic effect of the platinum and/or fluorine. Thus, it is important that the reagent contains a cation consisting of ammonium or aluminum, neither of which will adversely affect the catalyst. The ammonium ion will be liberated during subsequent heating of the catalyst, and the aluminum, which will be converted to alumina in the subsequent treatment of the catalyst, is not harmful to the catalyst which comprises substantially alumina.

Further, the reagent must contain an anion which is converted to an oxide and thus will remove the chlorine and in its place substitute an anion which will be converted to the oxide in the subsequent treatment. This again is important because it will not introduce undesirable anion impurities as, for example, those of sulfates, phosphates, etc.

A particularly preferred reagent for treating the catalyst according to the present invention comprises an aqueous ammonium nitrate solution. This solution will remove the chlorine as ammonium chloride and in place will substitute a nitrate radical which subsequently is released as nitrogen oxide to leave an oxide or a hydroxyl radical in place of the original chlorine radical. The ammonium nitrate is preferably utilized in aqueous solutions of from about 0.5 to about 10% concentrations. The treatment is preferably effected at an elevated temperature which may range from about 100° to about 200° F. and preferably is from about 150° to about 200° F. The volume of ammonium nitrate solution in relation to the volume of catalyst will depend upon the amount of chlorine contained in the catalyst and may range from about 0.25 to 5 volumes or more of ammonium nitrate solution per volume of catalyst.

Other suitable but not necessarily equivalent reagents for use in treating the catalyst include aqueous solutions of amino compounds such as alkylene polyamines including ethylenediamine, propylenetriamine, butylenetetramine, etc., monoamino compounds including methylamine, ethylamine, diethylamine, triethylamine, propylamine, dipropylamine, tripropylamine, butylamine, aniline, etc., alkanol amines, including ethanolamine, propanolamine, butanolamine, diethanolamine, triethanolamine, etc., ammonium salts such as ammonium formate, ammonium acetate, ammonium propionate, amonium butyrate, etc., as well as amonium hydroxide. Suitable aluminum salts include aluminum acetate, aluminum nitrate, etc.

In a specific application of the process of the present invention, the reforming process will be operated until the catalyst accumulates acidic components to an undesirable extent, after which the process is discontinued and the catalyst is treated either in situ or after removal from the reaction zone. The catalyst may be cooled to atmospheric temperature or to a temperature within the range of from about 100° to about 200° F. and then is treated with ammonium nitrate or other solutions one or more times as required, following which the catalyst may be washed with water to remove any excess ammonium compounds. When desired, the water washing treatment may be applied between each ammonium nitrate treatment. After the washing treatment, the catalyst preferably is dried, either in the presence or absence of hydrogen, at a temperature of from about 500° to about 1000° F. and then the catalyst is suitable for further use in the reforming process. In some cases, the drying treatment may be omitted and the drying accomplished during the reforming process.

In another application, the present invention may be utilized to treat a fresh catalyst which contains an excessive amount of acidic components. Thus, for example, a catalyst may be prepared to contain a given chlorine concentration and subsequently it is desired to reduce the chlorine concentration. This reduction of chlorine may be accomplished by the methods as hereinbefore set forth.

The following examples are introduced to illustrate further the novelty and utility of the present invention but not with the intention of unduly limiting the same.

EXAMPLE I

A Mid-Continent gasoline was subjected to reforming in the presence of a catalyst comprising alumina, 0.3% by weight of platinum, 0.3% by weight of fluorine, and 0.45% by weight of chlorine. After 64 days of operation, it was found that the chlorine concentration of the catalyst increased to 0.95% by weight.

EXAMPLE II

A Michigan straight run gasoline was subjected to reforming in the presence of the same catalyst described in Example I, and it was found that the chlorine content increased after 10 days operation from 0.45% by weight to 0.86% by weight.

EXAMPLE III

The catalyst of this example comprised alumina, 0.3% by weight of platinum, 0.1% by weight of fluorine and 0.36% by weight of chlorine. After 50 days' use in the reforming of a Michigan straight run gasoline, the chlorine content increased to 1.3% by weight.

A catalyst comprising alumina, 0.3% by weight of platinum, 0.1% by weight of fluorine and 1.3% by weight of chlorine was treated at a temperature of 195° F. with twice the volume of an aqueous ammonium nitrate solution of 3% concentration, after which the catalyst was washed with water and then treated again with twice the volume of another portion of the ammonium nitrate solution. The catalyst was then washed with water and dried at a temperature of 932° F. for 1 hour. The treated catalyst had a chlorine content of 0.19% by weight.

The catalyst containing 1.3% chlorine and the treated catalyst containing 0.19% by weight of chlorine were each separately utilized for the reforming of different portions of a Mid-Continent naphtha, having a boiling range of 229° to 387° F., at an average catalyst temperature of 850° F., a pressure of 500 pounds per square inch, a space velocity of 2 and a hydrogen:hydrocarbon ratio of 3:1.

The results of these reforming operations are shown in the following table. The extent of hydrocracking was determined by the amount of low boiling hydrocarbons containing from 1 to 5 carbon atoms per molecule which accumulated in a Dry Ice trap.

Table

| Chlorine Content of catalyst | Gms. $C_1$-$C_5$ Hydrocarbons | Vol. percent yield of Reformed Gasoline |
|---|---|---|
| 1.3% | 131.8 | 80.5 |
| 0.19% | 17.4 | 88.2 |

It will be noted from the above data that the catalyst containing 1.3% chlorine produced 131.8 gms. of low boiling hydrocarbons as compared to 21.5 gms. for the catalyst containing 0.19% chlorine. It also will be noticed that the yields of desired reformate dropped from 88.2% with the catalyst containing 0.19% chlorine to 80.5% with the catalyst containing 1.3% chlorine.

EXAMPLE IV

An aluminua-platinum-fluorine catalyst containing 0.35% by weight of chlorine was treated with ammonium hydroxide solution at a temperature of 160° F., and the chlorine content of the catalyst was reduced to 0.18% by weight.

I claim as my invention:

1. In the reforming of a hydrocarbon distillate containing chlorine in contact with a catalyst having dehydrogenating and hydrocracking activity, wherein chlorine from the distillate accumulates on the catalyst, whereby the hydrocracking activity of the catalyst is increased to an undesirable extent, the process which comprises discontinuing the contacting of the chlorine-containing distillate with said catalyst when the catalyst has accumulated an amount of chlorine causing excessive hydrocracking of the distillate, thereafter washing the catalyst with an aqueous solution of a compound having an anion convertible to an oxide and a cation selected from the group consisting of ammonium and aluminum, drying the washed catalyst, and subsequently resuming the contacting of hydrocarbon distillate with the thus treated catalyst.

2. The process of claim 1 further characterized in that said compound is ammonium nitrate.

3. The process of claim 1 further characterized in that said compound is aluminum nitrate.

4. The process of claim 1 further characterized in that said compound is ammonium hydroxide.

5. The process of claim 1 further characterized in that said catalyst comprises platinum, alumina and fluorine.

6. The process of claim 5 further characterized in that said compound is ammonium nitrate.

References Cited in the file of this patent
UNITED STATES PATENTS

| | | |
|---|---|---|
| 2,395,153 | Thomas et al. | Feb. 19, 1946 |
| 2,412,868 | Brown | Dec. 17, 1946 |
| 2,418,270 | Matuszak | Apr. 1, 1947 |
| 2,432,746 | Gary et al. | Dec. 16, 1947 |
| 2,455,260 | Meerdink | Nov. 30, 1948 |
| 2,479,109 | Haensel | Aug. 16, 1949 |
| 2,479,110 | Haensel | Aug. 16, 1949 |